Figure 1:
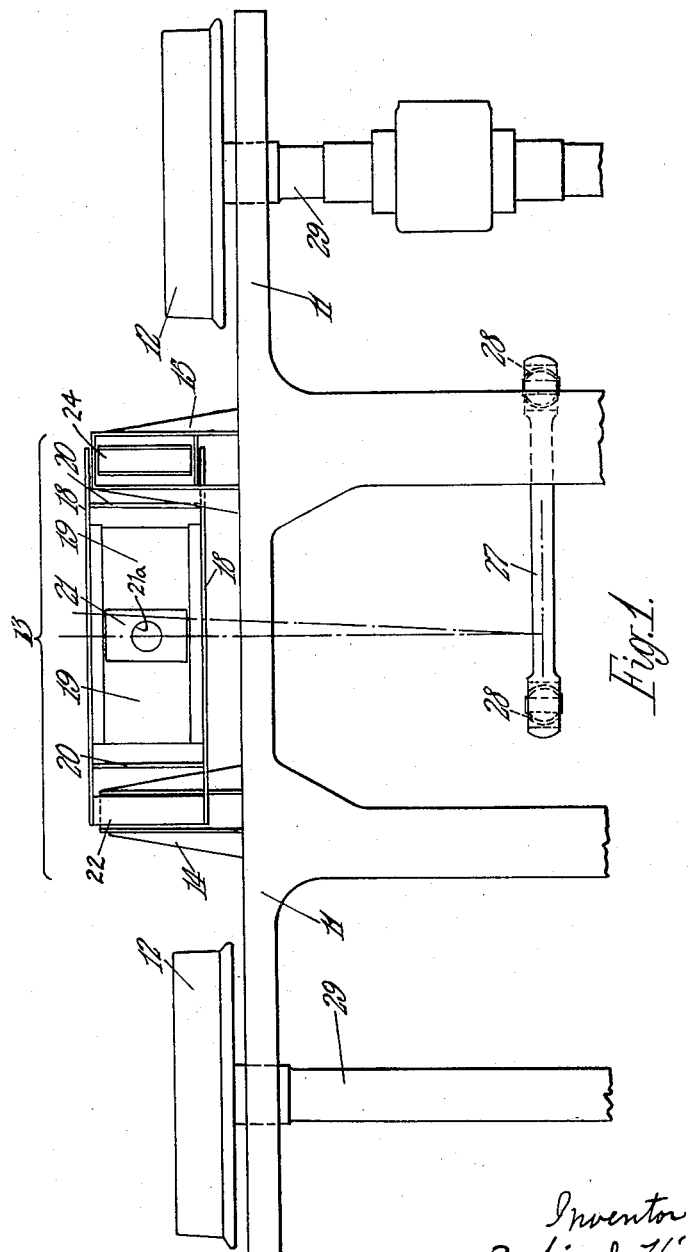

July 1, 1958

A. J. HIRST 2,841,096

SUSPENSION SYSTEM FOR THE BOGIES
OF RAILWAY AND LIKE VEHICLES

Filed Jan. 18, 1954

2 Sheets-Sheet 1

Inventor
Archie J. Hirst
By Ralph B. Stewart
Attorney

July 1, 1958
A. J. HIRST
2,841,096
SUSPENSION SYSTEM FOR THE BOGIES
OF RAILWAY AND LIKE VEHICLES
Filed Jan. 18, 1954
2 Sheets-Sheet 2
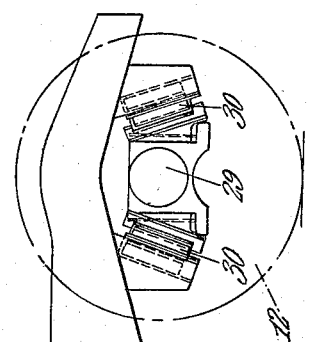
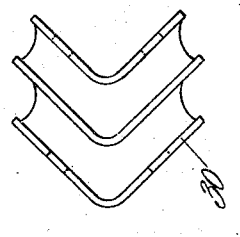
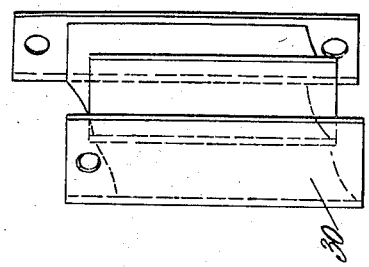
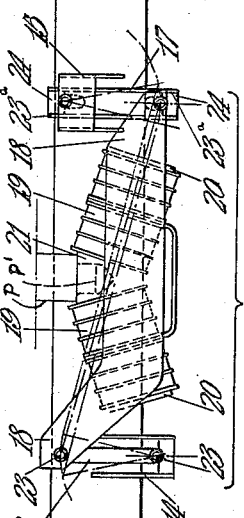
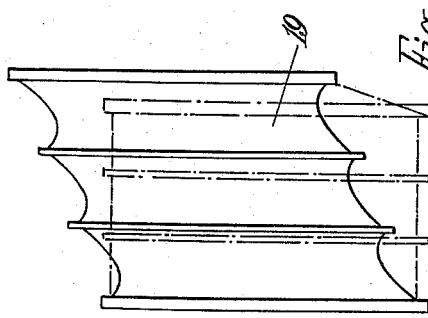
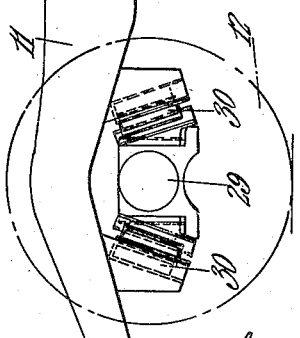
Inventor
Archie J. Hirst
By Ralph B. Stewart
Attorney

# United States Patent Office 2,841,096
Patented July 1, 1958

2,841,096

SUSPENSION SYSTEM FOR THE BOGIES OF RAILWAY AND LIKE VEHICLES

Archie John Hirst, Leicester, England, assignor to Metalastik Limited, Leicester, England, a corporation of Great Britain Application January 18, 1954, Serial No. 404,498

Claims priority, application Great Britain January 31, 1953

1 Claim. (Cl. 105—197)

It is known to suspend the body of a railway vehicle on a bogie by swing links pivotally connected to the lower ends of pedestals extending downwardly from the vehicle underframe to a point below the bogie side frames, from which the swing links extend upwardly and are pivotally connected to bearers on the bogie side frames. When such a vehicle is negotiating a curve, the displacement of the swing links from their normal vertical position so displaces the vehicle body that a gravitational restoring force is brought into existence tending to return the bogie to the straight-ahead position; this restoring force is proportional to the curvature of the track and to the wheel base of the vehicle, and it produces an undesirable load on the flanges of the wheels.

The object of present invention is to provide a bogie incorporating a vehicle body suspension such that the restoring force referred to is not produced or is substantially reduced compared with known arrangements.

The invention is characterised in that the bogie comprises a wheeled frame, a pair of upright, parallel links of substantially equal length spaced horizontally in the direction of travel of the bogie a pivotal connection between the bottom end of one of the links and the frame, a pivotal connection between the upper end of the other link and the frame, a beam pivotally connected to the free ends of the links, a support for a body of the vehicle, and a spring assembly between the beam and the body support the latter being held up solely by said assembly.

The following description relates to the accompanying drawings which are given by way of example only. In the drawings:

Fig. 1 is a diagrammatic plan view of one half of a bogie constructed in accordance with the present invention, Fig. 2 is a side elevation of the bogie of Fig. 1, Fig. 3 is an enlarged view of a rubber bolster spring, and Figs. 4 and 5 are enlarged views of an axle box spring.

The invention is shown in the drawings as applied to a four-wheel inside-frame bogie. The bogie frame (which comprises side members 11) is mounted upon the wheels 12 and carries a vehicle body by means of side linkages 13 each of which comprises a beam and supporting links therefor as will be described.

Bearers 14 and 15 extend laterally from each side member of the bogie frame, one bearer 14 being low down for supporting the link 16, the other bearer 15 being near the top of the side member, the link 17 hanging therefrom. The links 16 and 17 are of equal length and are parallel in the undisplaced position of the bogie. The links 16, 17 are spaced horizontally in the direction of travel of the bogie as is evident from Fig. 2. A beam 18 is pivotally connected to the free ends of links 16, 17 i. e. to the upper end of link 16 and the lower end of link 17. The beam is built up from side plates and transverse members and is straight for the greater part of its length from the pivotal connection with the lower end of the link 17 and is then inclined upwardly to the pivotal connection with the upper end of the link 16.

Rubber springs 19 are arranged between the side plates of the beam 18 with their compression axes in wide inverted V-formation. The outer ends of the springs 19 are mounted on inclined transverse members 20 of the built-up beam. The inner ends of the springs 19 engage a wedge-shaped member 21 which constitutes a support for the vehicle body e. g. member 21 is secured to the vehicle underframe (only a portion of which is shown) which includes a pedestal P extending downwardly from the frame. The pedestal P has a reduced end portion P' former thereon which is received in a bore 21a formed in the upper surface of the wedge-shaped member 21. A pedestal P is carried on each side of the underframe and the entire weight of the vehicle which is carried by the bogie is transferred by way of the two pedestals P to the two wedge-shaped members 21 and thence to springs 19 and beams 18. The inner ends of springs 19 are attached to the inclined faces of wedge-shaped member 21 by any suitable means, such as, for example, by bolts or pins.

In the normal load position the apex of the V formed by the compression axes of the springs 19 lies at the midpoint of the line joining the pivotal connections between the beam 18 and the links 16 and 17 respectively. To increase their compression stiffness the springs preferably have interleaves (see Fig. 3).

The pivotal connections of the links 16 and 17 with the bogie frame and beam 18 incorporate rubber joints of known construction. The joints of both links 16, 17 are long axially in proportion to their diameter to afford an adequate bearing surface and to give the linkage considerable lateral rigidity. Lateral movement of the vehicle body relative to the bogie is accommodated by movement of the rubber springs 19 in shear.

On the central longitudinal axis of the bogie a fore and aft strut 27 is provided which is connected at one end to a transsom on the bogie frame by a universal joint and at the other to the vehicle underframe also by a universal joint. These joints are indicated at 28. The strut is arranged horizontally and the small amount of angular movement of the strut e. g. due to rising and falling movement of the vehicle body relatively to the bogie or due to relative sideways movements between the body and the bogie is accommodated by the joints 28.

The bogie is supported from the axles 29 by suspension units comprising opposed slightly inclined chevron-shaped rubber sandwiches 30 according to our patent application Serial No. 423,658 (see also Figs. 4 and 5).

Instead of mounting the V springs 19 in the vertical planes of movement of the linkages 16, 17, 18 they may be in inwardly inclined planes to give the increased centralising force resisting lateral deflection of the vehicle body which results from the tendency with such an arrangement to lift the vehicle body on the side toward which it deflects.

I claim:

A bogie for a railway vehicle comprising a wheeled frame having side members, a pair of upright, parallel links of substantially equal length arranged adjacent one of said side members and spaced horizontally in the direction of travel of the bogie, a pivotal connection between the bottom end of one of the links and said one side member of the frame, a pivotal connection between the upper end of the other link and said one side member, a beam extending between said links and being pivotally connected to the upper end of the first said link and to the bottom end of the second said link, a support for the body of the vehicle located above the beam, and a spring assembly carried by the beam and extending therefrom up to the body support which is held up from the beam solely by means of said spring assembly.

References Cited in the file of this patent

UNITED STATES PATENTS

| | | |
|---|---|---|
| 1,226,756 | Dougherty | May 22, 1917 |
| 1,743,864 | O'Connor | Jan. 14, 1930 |
| 1,924,237 | Glascodine | Aug. 29, 1933 |
| 2,112,730 | Anderson | Mar. 29, 1938 |
| 2,165,702 | Haushalter | July 11, 1939 |
| 2,330,994 | Prantl | Oct. 5, 1943 |
| 2,333,058 | Travilla et al. | Oct. 26, 1943 |
| 2,517,671 | Jackson | Aug. 8, 1950 |

FOREIGN PATENTS

| | | |
|---|---|---|
| 432,304 | Great Britain | July 24, 1935 |
| 449,370 | Italy | June 11, 1949 |
| 131,738 | Sweden | May 22, 1951 |